(12) United States Patent
Bae et al.

(10) Patent No.: US 12,331,164 B2
(45) Date of Patent: Jun. 17, 2025

(54) CURABLE SILOXANE RESIN COMPOSITION

(71) Applicant: KOREA ADVANCED INSTITUTE OF SCIENCE AND TECHNOLOGY, Daejeon (KR)

(72) Inventors: Byeong-Soo Bae, Daejeon (KR); Seung-Mo Kang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 659 days.

(21) Appl. No.: 17/726,742

(22) Filed: Apr. 22, 2022

(65) Prior Publication Data

US 2023/0078587 A1  Mar. 16, 2023

(30) Foreign Application Priority Data

Sep. 14, 2021  (KR) .......................... 10-2021-0122305

(51) Int. Cl.
| | |
|---|---|
| *C08L 83/04* | (2006.01) |
| *C08G 77/00* | (2006.01) |
| *C08G 77/18* | (2006.01) |
| *C08G 77/20* | (2006.01) |
| *C08K 5/5415* | (2006.01) |

(52) U.S. Cl.
CPC ............. *C08G 77/20* (2013.01); *C08G 77/18* (2013.01); *C08G 77/80* (2013.01); *C08L 83/04* (2013.01)

(58) Field of Classification Search
CPC .......... C08G 77/20; C08G 77/80; C08K 5/14; C08L 83/04; C09D 183/04; C09J 183/04
USPC ............................................... 528/32, 43, 24
See application file for complete search history.

(56) References Cited

U.S. PATENT DOCUMENTS

| | | | |
|---|---|---|---|
| 4,401,500 A * | 8/1983 | Hamada ................. | C09D 5/002 |
| | | | 524/588 |
| 10,299,378 B2 | 5/2019 | Park | |
| 10,645,806 B2 | 5/2020 | Chen et al. | |
| 10,765,001 B2 | 9/2020 | Nakashima et al. | |
| 11,066,548 B2 | 7/2021 | Umehara et al. | |
| 2020/0115554 A1 | 4/2020 | Fukuda et al. | |

FOREIGN PATENT DOCUMENTS

| | | | |
|---|---|---|---|
| CN | 106947031 | 7/2017 | |
| JP | 2012111836 A * | 6/2012 | |
| JP | 2013-053186 | 3/2013 | |
| KR | 10-2011-0129587 | 12/2011 | |
| KR | 10-2012-0058854 | 6/2012 | |
| KR | 10-2016-0117052 | 10/2016 | |
| KR | 10-2016-0117053 | 10/2016 | |
| WO | 2019-221343 | 11/2019 | |
| WO | 2020-138642 | 7/2020 | |
| WO | WO-2021192100 A1 * | 9/2021 | ............. C08G 77/12 |

OTHER PUBLICATIONS

Yong Ho Kim et al., "Thermally Stable Siloxane Hybrid Matrix with Low Dielectric Loss for Copper-Clad Laminates for High-Frequency Applications", ACS Applied Materials & Interfaces 2016, 8, 13, 8335-8340, Mar. 16, 2016.

Xingrong Chen et al., "Cross-Linkable Fluorinated Polynorbornene with High Thermostability and Low Dielectric Constant at High Frequency", ACS Applied Polymer Materials 2020, 2, 2, 768-774, Dec. 18, 2019.

Jiajia Wang et al., "A New Fluorinated Polysiloxane with Good Optical Properties and Low Dielectric Constant at High Frequency Based on Easily Available Tetraethoxysilane (TEOS)", Macromolecules 2017, 50, 23, 9394-9402, Nov. 21, 2017.

* cited by examiner

*Primary Examiner* — Marc S Zimmer
(74) *Attorney, Agent, or Firm* — LEX IP MEISTER, PLLC

(57) ABSTRACT

Provided is a curable siloxane composition with low dielectric constant and low dielectric loss, in which organic alkoxy silane having a silicon-based asymmetric structure and organic alkoxy silane having a silicon-based symmetric structure are included. The curable siloxane composition has low dielectric constant and dielectric loss in a high frequency range, low water absorption, excellent workability, and high copper foil peel strength, and thus physical properties suitable for application to printed circuit boards for high-frequency communication electronic devices may be provided.

17 Claims, No Drawings

CURABLE SILOXANE RESIN COMPOSITION

CROSS-REFERENCE TO RELATED APPLICATION

This application claims priority to and the benefit of Korean Patent Application No. 10-2021-0122305 filed in the Korean Intellectual Property Office on Sep. 14, 2021, the entire contents of which are incorporated herein by reference.

BACKGROUND OF THE INVENTION (a) Field of the Invention

Provided are a curable siloxane resin composition having low dielectric constant and low dielectric loss, and a manufacturing method thereof.

(b) Description of the Related Art

Recently, with the development of electronic communication technologies such as smartphones, Internet of Things (IoT), augmented reality (AR), virtual reality (VR), and autonomous vehicles, complex interactions among electronic devices are gradually increasing, and fast transmission and reception of large capacity data are becoming important. Accordingly, the frequency band used to speed up data movement is expanding from ultra-high frequency (UHF, 300-3000 MHz) to superhigh frequency (SHF, 3-30 GHz) and extremely high frequency (EHF, 30-300 GHz). However, epoxy composites (FR-4) used in printed circuit boards of existing communication electronic devices are not suitable to be used as it is in high-frequency communication due to high dielectric constant and high dielectric loss. In addition, the loss increases rapidly upon electrical signal transmission as frequency increases. Therefore, it is essentially required to develop a substrate material having low dielectric constant and low dielectric loss and a printed circuit board using the same.

To date, many materials such as polyimide resins, fluorine-based polymer resins, and liquid crystal polymer resins have been proposed for the application to printed circuit boards for high-frequency communication electronic devices, but characteristics are not completely satisfied yet. For example, polyimide films are not suitable for application to printed circuit boards for high-frequency communication electronic devices due to high moisture absorption rate, dielectric constant, and dielectric loss. In order to overcome the issue, International Patent Publication No. WO 2019/221343 and U.S. Pat. No. 10,299,378 secured low dielectric constant by forming micropores inside polyimide films through each different method. However, there is no specific embodiment for dielectric loss, and thus the suitability as a material for printed circuit boards for high-frequency communication may not be determined.

As another example, a fluorine-based polymer resin has low dielectric constant and dielectric loss in the high frequency region but is hardly applicable to printed circuit boards due to low copper foil peel strength. Accordingly, in order to increase the copper foil peel strength, International Patent Publication No. WO 2020/138642 regulated the content of a resin, which is blended with a fluorine-based elastomer and a styrene-based elastomer, and an inorganic and organic filler. However, there is no specific embodiment proposed for the same, so the suitability as a material for printed circuit boards for high-frequency communication may not be determined.

The liquid crystal polymer resin also has low dielectric constant and dielectric loss but is hard to be applied to printed circuit boards due to the low copper foil peel strength. Accordingly, in U.S. Pat. No. 10,765,001, the copper foil peel strength is increased by making the surface of the liquid crystal polymer and a copper foil non-uniform. However, additional processing for making the surface non-uniform is required, and the sheet resistance increases if the surface of the copper foil is non-uniform to cause significant reduction in the data processing speed, thereby making it unsuitable as a material for printed circuit boards for high-frequency communication electronic devices.

In addition to the above materials, various materials such as a polyphenylene ether resin composition proposed in U.S. Pat. No. 10,645,806 and an epoxy resin composition proposed in U.S. Patent Laid-Open Publication No. 2020-0115554 have been proposed as a material for printed circuit boards for high-frequency communication electronic devices but are not suitable due to high dielectric constant and dielectric loss.

Accordingly, considering these characteristics, since there is difficulty in application to printed circuit boards for high-frequency communication electronic devices only with the materials proposed so far, it is necessary to develop a new material suitable for low dielectric constant and low dielectric loss substrates for high-frequency communication electronic devices.

SUMMARY OF THE INVENTION

An exemplary embodiment of the present invention provides a curable siloxane resin composition having low dielectric constant, low dielectric loss, and low hygroscopicity and exhibiting properties suitable for application to printed circuit boards for high-frequency communication electronic devices.

In addition to the above object, exemplary embodiments according to the present invention may be used to achieve other objects not specifically mentioned herein.

An exemplary embodiment provides a curable siloxane resin composition in which organic alkoxy silane having a silicon-based asymmetric structure and organic alkoxy silane having a silicon-based symmetric structure are mixed to enable the manufacturing of a siloxane resin.

In addition, an exemplary embodiment provides a cured siloxane resin composition manufactured by heat treatment of the curable siloxane resin composition.

In addition, an exemplary embodiment provides a glass fabric reinforced plastic (GFRP) film or sheet including a cured product of the curable siloxane resin composition and a glass cloth.

In addition, an exemplary embodiment provides a copper clad laminate (CCL) or a flexible copper clad laminate (FCCL) including a glass fabric reinforced plastic film or sheet.

In addition, an exemplary embodiment provides a printed circuit board (PCB) or a flexible printed circuit board (PCB) including a copper clad laminate or a flexible copper clad laminate.

A curable siloxane resin composition according to an exemplary embodiment has low dielectric constant and dielectric loss in a high frequency range, low water absorption, excellent workability, and high copper foil peel strength, thereby providing physical properties suitable for application to printed circuit boards for high-frequency communication electronic devices.

DETAILED DESCRIPTION OF THE EMBODIMENTS

An exemplary embodiment of the present invention will be described in detail so that a person of an ordinary skill in the art to which the present invention pertains may easily implement the same. As those skilled in the art would realize, the described embodiments may be modified in various different ways, all without departing from the spirit or scope of the present invention. In addition, in the case of a well-known technology, a detailed description thereof will be omitted.

In addition, throughout the specification, unless explicitly described to the contrary, the word "comprise", and variations such as "comprises" or "comprising", will be understood to imply the inclusion of stated elements but not the exclusion of any other elements.

Throughout the specification, the term "combination(s) thereof" included in an expression of the Markush form will be understood to imply mixing or combination of at least one selected from the group consisting of the constituent elements described in the expression of the Markush form, referring to the inclusion of at least one selected from the group consisting of constituent elements.

Throughout the specification, the term "alkyl group" used herein may include a linear or branched C1-7 alkyl group or a C1-20 alkyl group, respectively, for example, methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosanyl, or all possible isomers thereof, but may not be limited thereto.

Throughout the specification, the term "alkenyl group" used herein refers to a monovalent hydrocarbon group in which at least one carbon-carbon double bond is included in an alkyl group having two or more carbon atoms in the alkyl groups and may be the inclusion of a linear or branched, C2-20 alkenyl group, but may not be limited thereto.

Throughout the specification, the term "an aryl group" used herein refers to a monovalent functional group formed by removal of a hydrogen atom present in at least one cyclic arene and may include a C6-20 aryl group, for example, phenyl, biphenyl, terphenyl, naphthyl, anthryl, phenanthryl, pyrenyl, or all possible isomers thereof, but may not be limited thereto. Arene is a hydrocarbon group having an aromatic cyclic ring and includes a monocyclic or polycyclic hydrocarbon group, and the polycyclic carbonhydrogen group may include at least one aromatic cyclic ring and may include an aromatic cyclic or a non-aromatic cyclic ring as an additional cyclic ring, but may not be limited thereto.

Throughout the specification, the term "alkoxy group or alkoxy" used herein refers to a form to which an alkyl group and an oxygen atom are bonded and may include a C1-20 alkoxy group, for example, methoxy, ethoxy, propoxy, butoxy, pentoxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, eicosanyloxy, or all possible isomers thereof, but may not be limited thereto.

Throughout the specification, the term "siloxane resin composition" used herein refers to a composition including raw materials for manufacturing a siloxane resin, or a composition including a siloxane resin.

Throughout the specification, the copper clad laminate may include both a rigid copper clad laminate or a flexible copper clad laminate.

Throughout the specification, the printed circuit board may include both a rigid printed circuit board or a flexible printed circuit board.

Then, the curable siloxane resin composition according to an exemplary embodiment will be described in detail.

An exemplary embodiment is a siloxane resin composition in which organic alkoxy silane having a silicon-based asymmetric structure and organic alkoxy silane having a silicon-based symmetric structure are mixed to enable the manufacturing of a siloxane resin.

The organic alkoxy silane having a silicon-based symmetric structure acts as an important factor in having dielectric characteristics suitable for application to printed circuit boards for electronic devices.

More specifically, when symmetry of a molecular structure of an entire polymer with respect to a main chain increases in the high-frequency range, the polarizability of the entire polymer is lowered and the dipole moment is lowered, so it is advantageous to have low dielectric constant and low dielectric loss characteristics. In addition, when the dipole moment of a side chain itself symmetric with respect to the main chain is low, the polarizability of the entire polymer is lowered and the dipole moment is lowered, so it is advantageous to have low dielectric constant and low dielectric loss characteristics.

For example, when the molar amount of the organic alkoxy silane having a silicon-based symmetric structure is smaller than that of organic alkoxy silane having a silicon-based asymmetric structure, dielectric characteristics suitable for application to printed circuit boards for high-frequency communication electronic devices may not be obtained. In addition, among organic alkoxy silanes having a silicon-based symmetric structure, the greater the molar amount of organic siloxane having a silicon-based symmetric structure including an aryl group, the lower the dipole moment, thereby having more suitable dielectric characteristics for application to printed circuit boards for high-frequency communication electronic devices. This is confirmed by the experimental results of Examples and Comparative Examples to be described later.

For example, organic alkoxy siloxane having a silicon-based symmetric structure includes organic alkoxy siloxane having a silicon-based symmetric structure including an aryl group, and thus the performance of low dielectric constant and low dielectric loss of a siloxane resin may be improved. In addition, the organic alkoxy siloxane having a silicon-based symmetric structure may optionally further include organic alkoxy siloxane having a silicon-based symmetric structure including an alkyl group. In this case, performance of low dielectric constant and low dielectric loss of a siloxane resin may further be improved. Furthermore, in organic alkoxy siloxane having a silicon-based symmetric structure, when organic alkoxy siloxane having a silicon-based symmetric structure including an aryl group is used more than organic alkoxy siloxane having a silicon-based symmetric structure including an alkyl group, the dipole moment is reduced, thereby maximizing performance of low dielectric constant and low dielectric loss of the siloxane resin.

For example, first organic alkoxy silane having a silicon-based asymmetric structure may be represented by the following Chemical Formula 1.

$$R^1_a R^2_b Si(OR^3)_2 \qquad \text{[Chemical Formula 1]}$$

In Chemical Formula 1,
$R^1$ includes a linear or branched $C_{2-20}$ alkenyl group,
$R^2$ includes H, a linear or branched $C_{1-20}$ alkyl group, a $C_{6-20}$ aryl group, or a $C_{2-20}$ alkenyl group,
$R^3$ includes a linear or branched $C_{1-7}$ alkyl group, and $1 \leq a \leq 2$, $0 \leq b \leq 1$, and $a+b=2$.

The first organic alkoxy silane having a silicon-based asymmetric structure may include one or more of vinylmethyldimethoxysilane, vinylmethyldiethoxysilane, vinylphenyldimethoxysilane, vinylphenyldiethoxysilane, divinyldimethoxysilane, divinyldiethoxysilane, allyldimethoxysilane, allylmethyldimethoxysilane, allylmethyldiethoxysilane, or dimethoxymethyl (4-vinylphenyl)silane.

For example, second organic alkoxy silane and third organic alkoxy silane having a silicon-based symmetric structure may be represented by the following Chemical Formula 2 and Chemical Formula 3, respectively.

$$R^4{}_2Si(OR^5)_2 \qquad \text{[Chemical Formula 2]}$$

In the above Chemical Formula 2,
$R^4$ includes a $C_{6-20}$ aryl group, and
$R^5$ includes a linear or branched $C_{1-7}$ alkyl group.

$$R^6{}_2Si(OR^7)_2 \qquad \text{[Chemical Formula 3]}$$

In the above Chemical Formula 3,
$R^6$ includes a linear, branched, or cyclic $C_{1-20}$ alkyl group, and
$R^7$ includes a linear or branched $C_{1-7}$ alkyl group.

The second organic alkoxy silane having a silicon-based symmetric structure represented by the above Chemical Formula 2 may include one or more of diphenyldimethoxysilane, diphenyldiethoxysilane, bis(4-methylphenyl)dimethoxysilane, bis(4-methylphenyl)diethoxysilane, bis(o-tolyl)dimethoxysilane, bis(o-tolyl)diethoxysilane, bis(m-tolyl)diethoxysilane, bis(m-tolyl)dimethoxysilane di(naphthalen-1-yl)dimethoxysilane, or di(naphthalen-1-yl)diethoxysilane.

The third organic alkoxy silane having a silicon-based symmetric structure represented by the above Chemical Formula 3 may include one or more of dimethyldimethoxysilane, dimethyldiethoxysilane, diisobutyldimethoxysilane, diisobutyldiethoxysilane, diisopropyldimethoxysilane, diisopropyldiethoxysilane, di-n-butyldimethoxysilane di-n-butyldiethoxysilane, di-n-propyldimethoxysilane, di-n-propyldiethoxysilane, dicyclopentyldimethoxysilane, or dicyclopentyldiethoxysilane.

A siloxane resin may be prepared by hydrolysis and a condensation reaction of the first organic alkoxy silane having a silicon-based asymmetric structure, the second organic alkoxy silane having a silicon-based symmetric structure, and the third organic alkoxy silane having a silicon-based symmetric structure. The siloxane resin prepared thereby may be represented by the following Chemical Formula 4.

$$(R^1{}_aR^2{}_bSiO)_x(R^4{}_2SiO)_y(R^6{}_2SiO)_z \qquad \text{[Chemical Formula 4]}$$

In the above Chemical Formula 4,
$R^1$ includes a linear or branched $C_{2-20}$ alkenyl group,
$R^2$ includes H, a linear or branched $C_{1-20}$ alkyl group, a $C_{6-20}$ aryl group, or a $C_{2-20}$ alkenyl group,
$R^4$ includes a $C_{6-20}$ aryl group,
$R^6$ includes a linear, branched, or cyclic $C_{1-20}$ alkyl group, and
$1 \leq a \leq 2$, $0 \leq b \leq 1$, $a+b=2$,
$1 \leq x$, $1 \leq y$, $1 \leq z$, and $x \leq y+z$.

A siloxane resin manufacturing method includes preparing a mixture by mixing first organic alkoxy silane having a silicon-based asymmetric structure, second organic alkoxy silane having a silicon-based symmetric structure, third organic alkoxy silane having a silicon-based symmetric structure, and an acid or base catalyst, agitating the mixture and carrying out a condensation reaction at 40° C. to 300° C., removing the acid or base catalyst, and adding a peroxide radical polymerization initiator.

When the siloxane resin is prepared by the hydrolysis and condensation reaction of organic alkoxy silane, the degree of condensation of the siloxane resin is significantly increased while stiffness is increased, so that the dielectric constant and dielectric loss of a siloxane resin composition may be drastically reduced. For example, when a resin is prepared by a non-hydrolytic condensation reaction of organic alkoxy silane and organic silanediol, the degree of condensation is decreased, thereby having higher dielectric constant and dielectric loss than the siloxane resin composition.

In the case of preparing the siloxane resin, the preparation may be achieved by adjustment of reaction conditions such as the reaction temperature, the reaction atmosphere, the amount of water, and the type and amount of the acid or base catalyst during the hydrolysis and condensation reaction of the organic alkoxy silane.

The acid catalyst may include one or more of hydrochloric acid, sulfuric acid, nitric acid, formic acid, acetic acid, toluenesulfonic acid, acetic acid, butyric acid, palmitic acid, oxalic acid, or tartaric acid.

The base catalyst may include one or more of an alkali metal compound, an alkaline-earth metal compound, a quaternary ammonium compound, ammonia, or an amine compound. For example, at least one selected from the group may be included, wherein the group consists of an alkali metal compound selected among sodium hydroxide, potassium hydroxide, and lithium hydroxide, an alkaline earth metal compound selected among barium hydroxide monohydrate, barium hydroxide octahydrate, calcium hydroxide, and magnesium hydroxide, a quaternary ammonium compound selected among tetraalkylammonium silanolate, tetraethylammonium hydroxide, tetramethylammonium chloride, and tetrabutylammonium fluoride, ammonia, amine compounds, and combinations thereof.

For example, when preparing the siloxane resin by the hydrolysis and condensation reaction of organic alkoxy silane, the preparation may be carried out by agitating a mixture of organic alkoxy silane, water, and an acid or base catalyst at 40 to 300° C. under a nitrogen atmosphere for 2 to 48 hours. At this time, water in the mixture may be included in an amount of 0.5 to 10 moles based on 1 mole of organic alkoxy silane, and the acid or base catalyst may be included in an amount of 0.001 to 0.1 moles based on 1 mole of the organic alkoxy silane, but may not be limited thereto.

When acid and base catalysts are added during the hydrolytic condensation reaction of organic alkoxy silane, the acid and base catalysts may be removed according to a commonly known physical or chemical method in order to secure electrical stability through reduction of the moisture absorption rate of the prepared siloxane resin, but may not be limited thereto.

The siloxane resin composition may include an additional cross-linking agent for making physical properties thereof suitable for printed circuit boards for high-frequency communication electronic devices, but may not be limited thereto.

The cross-linking agent may include at least one selected from the group consisting of vinyltetramethyldisiloxane, vinylpentamethyldisiloxane, 1,3-divinyl-1,3-diphenyl-1,3- dimethyldisiloxane, 1,3-divinyltetraphenyldisiloxane, 1,1,3,3-tetravinyldimethyldisiloxane, 1,3-divinyltetraethoxydisiloxane, 1,3-divinyltetrakis(trimethylsiloxy)disiloxane, 1,3-divinyltetramethyldisiloxane, 1,3-diphenyltetrakis(dimethylsiloxy)disiloxane, hexamethyldisiloxane 1,5-divinyl-3,3-diphenyl-1,1,5,5-tetramethyltrisiloxane, 1,5-divinyl-3-phenylpentamethyltrisiloxane, 1,3,5-trivinyl-1,1,3,5,5-pentamethyltrisiloxane 2,4,6-trivinyl-2,4,6-trimethylcyclotrisiloxane, 2,4,6,8-tetravinyl-2,4,6,8-tetramethylcyclotetrasiloxane, octavinyl-T8-silsesquioxane, phenyltris(trimethylsiloxy)silane, phenyltris(dimethylsiloxy)silane, tris(trimethylsiloxy)silane, tris(vinyldimethylsiloxy)methylsilane, tris(vinyldimethylsiloxy)phenylsilane, tris(dimethylsiloxy)silane, divinylbenzene, p-divinylbenzene, vinyldimethylsilane, vinyltrimethylsilane, vinyltriethylsilane, vinyltriphenylsilane, vinyl-t-butyldimethylsilane, vinyl-di-n-octylmethylsilane, vinylphenylmethylsilane, vinylphenyldimethylsilane, divinyldimethylsilane, trivinylsilane, trivinylmethylsilane, tetravinylsilane, vinyldimethylmethoxysilane, vinylphenylmethylmethoxysilane, vinyldimethylethoxysilane, vinyldiphenylethoxysilane, vinylmethyldimethoxysilane, vinylmethyldiethoxysilane, vinylphenyldiethoxysilane, vinyltrimethoxysilane, vinyltriethoxysilane, vinyl triisopropoxysilane, vinyltri-t-butoxysilane, vinyltriisoprophenoxysilane, vinyltriphenoxysilane, vinyltris(2-methoxyethoxy)silane, vinyltris(methoxypropoxy)silane, trivinylmethoxysilane, trivinylethoxysilane, vinylmethylbis(trimethylsiloxy)silane, vinyltris(dimethylsiloxy)silane, vinyltris(trimethylsiloxy)silane, tetrakis(vinyldimethylsiloxy)silane, vinylmethyldiacetoxysilane, vinyltriacetoxysilane, 2-prophenyltrimethylsilane, (1-methoxyvinyl)trimethylsilane, 1,2-divinyltetramethyldisilane, 1,4-divinyltetramethyldisilylethane, 1,4-bis(vinyldimethylsilyl)benzene, 1-allyl-1,1,3,3-tetramethyldisiloxane, 1,3-diallyltetramethyldisiloxane and 1,3-diallyltetrakis(trimethylsiloxy)disiloxane, allyldimethylsilane, allyltrimethylsilane, allyltriisopropylsilane, allyltriphenylsilane, diallyldimethylsilane, diallyldiphenylsilane, triallylmethylsilane, tetraallylsilane, allyldimethoxysilane, allyltrimethoxysilane, allyltriethoxysilane, allyltriphenoxysilane, allyltris(trimethylsiloxy)silane, 2,4,6,8-tetramethylcyclotetrasiloxane, octamethyl-T8-silsesquioxane, 1,1-bis(trimethylsilylmethyl)ethylene, 1,1-bis(trimethylsilylmethyl)ethylene, methallyltrimethylsilane, diethoxymethylsilane, dimethoxymethylsilane, n-octadecylmethyldiethoxysilane, n-octadecyldimethylethoxysilane, n-octadecyldimethylmethoxysilane, n-octadecylmethyldimethoxysilane, n-octadecyldimethylsilane, n-octylmethyldiethoxysilane, n-octylmethyldimethoxysilane, n-octyldimethylmethoxysilane, n-octyldimethylethoxysilane, isobutylmethyldimethoxysilane, bis(trimethylsiloxy)methylmethoxysilane, tris(trimethylsilyl)silane, 1,2-diethoxytetramethyldisilane, phenyldimethylethoxysilane, n-propylmethyldimethoxysilane, n-propyldimethylmethoxysilane, methyltriethoxysilane, methyltrimethoxysilane, dimethyldimethoxysilane, dimethyldiethoxysilane, phenylmethyldimethoxysilane, phenylmethyldiethoxysilane, phenylethynetrimethylsilane, diphenylmethylethoxysilane, diphenylmethylmethoxysilane, diphenylmethylsilane, phenyldimethylsilane, 1,3-dimethyltetramethoxydisiloxane, tetrakis(dimethylsiloxy)silane, methyltris(methoxyethoxy)silane, ethyldimethylsilane, dimethylethoxysilane, tris(trimethylsiloxy)silane, tert-butyldimethylsilane, di-tert-butylmethylsilane, 1,1,2,2-tetramethyldisilane, 1,1,3,3,5,5-hexamethyltrisilane, 1,5-diethoxyhexamethyltrisiloxane, phenyltrimethylsilane, 1,4-bis(4 vinylphenoxy)butane, di-4-vinylbenzyl ether, divinyldiphenyl, divinylnaphthalene, 1-heptene, 1-octene, 1,4-pentadiene, 1,5-hexadiene, 1,6-heptadiene, 1,7-octadiene, 1,9-decadiene, and combinations thereof.

The siloxane resin composition may include a peroxide radical polymerization initiator for polymerization of siloxane and an alkenyl group included in the cross-linking agent.

The peroxide radical polymerization initiator may include at least one selected from the group consisting of 2,3-dimethyl-2,3-diphenylbutane, tert-butyl-hydroperoxide, tert-amylhydroperoxide, cumylhydroperoxide, 1,1,3,3-tetramethylbutylhydroperoxide, isopropylcumylhydroperoxide, isopropylbenzene hydroperoxide, 2,5-dimethyl-2,5-di(tert-butylperoxy)hexyne-3,3,6,9-triethyl-3,6,9-trimethyl-1,4,7-triperoxonane, di(tert-butyl)-peroxide, 2,5-dimethyl-2,5-di(tert-butylperoxy)hexane, di(tert-butylperoxy-isopropyl)benzene, tert-butylcumylperoxide, di-(tert-amyl)-peroxide, dicumylperoxide, butyl4,4-di(tert-butylperoxy)valerate, tert-butylperoxybenzoate, 2,2-di(tert-butylperoxy)butane, tert-amylperoxy-benzoate, tert-butylperoxy-acetate, tert-butylperoxy-(2-ethyl hexyl)carbonate, tert-butylperoxy isopropyl carbonate, tert-butylperoxy-3,5,5-trimethylhexanoate, 1,1-di(tert-butylperoxy)cyclohexane, tert-amylperoxyacetate, tert-amylperoxy-(2-ethylhexyl)carbonate, 1,1-di(tert-butylperoxy)-3,5,5-trimethylcyclohexane, 1,1-di(tert-amylpooxy)cyclohexane, tert-butyl-monoperoxymalate, 1,1'-azodi(hexahydrobenzonitrile), tert-butylperoxyisobutyrate, tert-butyl peroxydiethylacetate, tert-butylperoxy-2-ethyl hexanoate, benzoyl peroxide, tert-amylperoxy-2-ethylhexanoate, di(3-methylbenzoyl)peroxide, 1,1,3,3-tetramethylbutyl peroxy-2-ethylhexanoate, ammonium peroxodisulfate, 2,5-dimethyl-2,5-di(2-ethylhexanoylperoxy)hexane, 2,2'-azodi(2-methylbutyronitrile), 2,2'-azodi(isobutyronitrile), didecanoylperoxide, dilauroylperoxide, di(3,5,5-trimethylhexanoyl)peroxide, tert-amylperoxypivalate, tert-butylperoxyneoheptanoate, 1,1,3,3-tetramethylbutyl peroxypivalate, tert-butylperoxypivalate, dicetylperoxydicarbonate, dimyristyl peroxydicarbonate, di(2-ethylhexyl)peroxydicarbonate, di(4-tert-butylcyclohexyl) peroxycarbonate, diisopropylperoxydicarbonate, tert-butylperoxyneodecanoate, di-sec-butylperoxydicarbonate, tert-amylperoxyneodecanoate, cumyl peroxyneoheptanoate, di(3-methoxybutyl)peroxydicarbonate, 1,1,3,3-tetramethyl butylperoxyneodecanoate, cumylperoxyneodecanoate, diisobutyrylperoxide, and combinations thereof.

The peroxide radical polymerization initiator acts as an important factor for the siloxane resin composition to have copper foil peel strength suitable for application to printed circuit boards for electronic devices.

For example, when curing is carried out by initiation of the peroxide radical polymerization initiator while the siloxane resin composition and a copper foil come in contact, a chemical bond between a hydroxyl group on the surface of the copper foil and an alkenyl group in the siloxane resin composition is induced, thereby having high copper foil peel strength since bonding with high strength is possible between the copper foil and the siloxane resin composition.

The peroxide radical polymerization initiator may be included in an amount of 0.01 parts by weight to 5 parts by weight or less based on 100 parts by weight of the organic alkoxy silane having a silicon-based asymmetric structure and organic alkoxy silane having a silicon-based symmetric structure.

The peroxide radical polymerization initiator may function by heat treatment in a temperature range of 40° C. to 300° C.

The heat treatment may be performed in a time range of 5 minutes to 6 hours, but may not be limited thereto.

By using the peroxide radical polymerization initiator, it is possible to prepare cured siloxane by curing the siloxane resin composition.

The cured siloxane may have dielectric constant of 3.2 or less at a frequency of 10 GHz and dielectric loss of 0.005 or less at a frequency of 10 GHz, which are dielectric characteristics suitable for application to printed circuit boards for high-frequency communication electronic devices.

When the cured siloxane with low dielectric constant and low dielectric loss is prepared by curing the siloxane resin composition after removing the acid or base catalyst added to the siloxane resin by physical and chemical methods, it is possible to secure the moisture absorption rate of 0.1% or less, which is the moisture absorption characteristic suitable for application to printed circuit boards for high-frequency communication electronic devices. For example, the removing of the acid or base catalyst may include adding an organic solvent to dissolve the siloxane resin and then separating the organic solvent, in which the siloxane resin is dissolved, from the acid or base catalyst by a solvent extraction method.

An exemplary embodiment may provide a glass fabric reinforced plastic film or sheet by including a glass cloth in the cured siloxane.

The glass cloth may include a woven glass fabric, a non-woven glass fabric, or a mixture thereof, woven with glass fibers including at least one selected from the group consisting of A glass, C glass, D glass, E glass, AR glass, R glass, S glass, S-2 glass, T glass, NE glass, E-CR glass, quartz, or G combinations thereof, but may not be limited thereto.

When preparing a glass fabric reinforced plastic film or sheet by including the glass cloth in the cured siloxane, the thermal expansion coefficient is significantly lowered to be advantageous for thermal processing, and an additional dielectric loss reduction effect may be expected.

An exemplary embodiment may provide a copper clad laminate or a flexible copper clad laminate including a glass fabric reinforced plastic film or sheet.

In the preparation of the copper clad laminate or the flexible copper clad laminate, when preparing under heat treatment conditions while a copper foil is adhered to the siloxane resin composition including the glass cloth, excellent copper foil peel strength may be obtained without an additional adhesive as described above, which is copper foil peel strength characteristics suitable for application to printed circuit boards for high-frequency communication electronic devices.

An exemplary embodiment may provide a printed circuit board or a flexible printed circuit board including a copper clad laminate or a flexible copper clad laminate.

The curable siloxane resin composition has hygroscopic resistance, thermal workability, heat resistance, high adherence to copper foils, low dielectric constant, and low dielectric loss, and is able to implement balanced properties suitable for printed circuit boards for high-frequency communication electronic devices.

Hereinafter, the present invention will be described in more detail with Examples, but the following Examples are only an exemplary embodiment of the present invention, and the present invention is not limited to the Examples.

Example 1

Vinylmethyldimethoxysilane (Gelest), diphenyldimethoxysilane (Gelest), and aqueous hydroxidesodium solution (NaOH(aq), Samchun) were mixed in a mole ratio of 1:1:2. The mixture was then agitated at 80° C. under a nitrogen atmosphere for 12 hours. In order to remove a base catalyst from a siloxane resin obtained after agitation, the mixture was mixed with methylisobutylketone (MIBK, Samchun) and water ($H_2O$) in a weight ratio of 1:2:1. Due to the difference in solubility, the MIBK layer in which siloxane is dissolved and the water layer in which the base catalyst is dissolved were separated. After obtaining only the MIBK layer, using an under reduced pressure evaporation machine, the MIBK was evaporated at −0.1 MPa and 120° C. for 2 hours to finally obtain a siloxane resin.

A siloxane composition for curing was prepared by adding 1 part by weight of di(tert-butyl)-peroxide (DTBP, Sigma Aldrich) based on 100 parts by weight of the siloxane resin to the prepared siloxane resin.

Cured siloxane was prepared through heat treatment (4 hr, 150° C.) of the prepared siloxane composition for curing.

Example 2

Cured siloxane was prepared in the same manner as in Example 1, except that vinylmethyldimethoxysilane, diphenyldimethoxysilane, and the aqueous hydroxidesodium solution were mixed in a mole ratio of 0.4:0.6:1.

Example 3

Cured siloxane was prepared in the same manner as in Example 1, except that vinylmethyldimethoxysilane, diphenyldimethoxysilane, and the aqueous hydroxidesodium solution were mixed in a mole ratio of 0.3:0.7:1.

Example 4

Cured siloxane was prepared in the same manner as in Example 1 except that vinylmethyldimethoxysilane, diphenyldimethoxysilane, dimethoxydimethylsilane (Gelest), and the aqueous hydroxidesodium solution were mixed in a mole ratio of 0.15:0.3:0.05:1.

Example 5

A siloxane composition and cured siloxane were prepared in the same manner as in Example 1, except that vinylmethyldimethoxysilane, diphenyldimethoxysilane, and hydrochloric acid ($HCl_{(aq)}$, Samchun) were mixed in a mole ratio of 0.4:0.6:1.

Example 6

Cured siloxane was prepared in the same manner as in Example 1, except that octavinyl-T8-silsesquioxane (Hybrid Plastics) was added as a cross-linking agent to the siloxane composition prepared in Example 1.

Example 7

The siloxane composition prepared in Example 1 was impregnated with a glass cloth (NE-glass, #1037, Nittobo) and then cured to prepare a glass fabric reinforced plastic film.

Example 8

The siloxane composition prepared in Example 2 was impregnated with a glass cloth (NE-glass, #1037) and then cured to prepare a glass fabric reinforced plastic film.

Example 9

The siloxane composition prepared in Example 3 was impregnated with a glass cloth (NE-glass, #1037) and then cured to prepare a glass fabric reinforced plastic film.

Example 10

The siloxane composition prepared in Example 4 was impregnated with a glass cloth (NE-glass, #1037) and then cured to prepare a glass fabric reinforced plastic film.

Example 11

The siloxane composition prepared in Example 2 was impregnated with a glass cloth (Quartz glass, SQX 2116C-04, Shin Etsu) and then cured to prepare a glass fabric reinforced plastic film.

Example 12

The siloxane composition prepared in Example 2 was impregnated with a glass cloth (NE-glass, #1037) and then cured with copper foils covered on both sides to prepare a copper clad laminate.

Comparative Example 1

A siloxane composition was prepared, and cured siloxane was prepared in the same method as in Example 1, except that vinylmethyldimethoxysilane and an aqueous hydroxidesodium solution were mixed in a mole ratio of 1:2.

Comparative Example 2

A siloxane composition was prepared, and cured siloxane was prepared in the same method as in Example 1, except that vinylmethyldimethoxysilane, diphenylsilandiol (Gelest) and hydroxidebarium monohydrate (Ba(OH)2H2O, Sigma Aldrich) were mixed in a mole ratio of 1:1:0.002.

Comparative Example 3

A siloxane resin composition was prepared, and cured siloxane was prepared in the same method as in Example 1, except for a base catalyst removal process.

Comparative Example 4

A siloxane composition was prepared, and cured siloxane was prepared in the same method as in Example 1, except that vinylmethyldimethoxysilane, dimethyldimethoxysilane, and an aqueous hydroxidesodium solution were mixed in a mole ratio of 1:1:2.

Comparative Example 5

A glass fabric reinforced plastic film was prepared by impregnating the siloxane composition prepared in Comparative Example 1 with a glass cloth (NE-glass, #1037) and then curing the same.

Comparative Example 6

A glass fabric reinforced plastic film was prepared by impregnating the siloxane composition prepared in Comparative Example 2 with a glass cloth (NE-glass, #1037) and then curing the same.

Comparative Example 7

A glass fabric reinforced plastic film was prepared by impregnating the siloxane composition prepared in Comparative Example 3 with a glass cloth (NE-glass, #1037) and then curing the same.

Experimental Example 1—Dielectric Constant and Dielectric Loss Measurement Experiment The dielectric constant and dielectric loss at 10 GHz of the cured siloxane and the glass fabric reinforced plastic film prepared according to Example 1 to 9, 11, 12, and Comparative Examples 1 to 6 were measured with a Vector Network analyzer (Keysight, N5222B) and a Split post dielectric resonator (QWED, for 10 GHz), and the measurement results were shown in the following Table 1.

Experimental Example 2—Hygroscopic Resistance Measurement Experiment

The hygroscopic resistance of the cured siloxane and the glass fabric reinforced plastic film prepared according to Examples 1 to 9, 11, 12, and Comparative Examples 1 to 6 were measured based on ASTM D570 standard, and the measurement results were shown in the following Table 1.

Experimental Example 3—Thermal Expansion Coefficient Measurement Experiment

The thermal expansion coefficient of the cured siloxane and the glass fabric reinforced plastic film prepared according to Examples 1 to 9, 11, 12, and Comparative Examples 1 to 6 was measured with Thermo Mechanical Analyzer (TMA, SS6100, SII Co.). The measurement standard is that the thermal expansion coefficient was measured in a temperature range of about 50-150° C. by heating to about 225° C. at a temperature increase rate of about 5° C./min in a nitrogen atmosphere, and the measurement results were shown in the following Table 1 below.

Experimental Example 4—Copper Foil Peel Strength Measurement Experiment

The peel strength of the copper foil and the glass fabric reinforced plastic film of the copper clad laminate prepared according to Example 10 was measured based on ASTM D6862 standard, and the measurement results were shown in the following Table 1.

TABLE 1

| | Dielectric constant | Dielectric loss | Hygro-scopicity | Thermal expansion coefficient (ppm/° C.) | Copper foil peel strength (N/mm) |
|---|---|---|---|---|---|
| Example 1 | 2.81 | 0.0029 | 0.041% | 61 | — |
| Example 2 | 2.83 | 0.0026 | 0.038% | 58 | — |
| Example 3 | 2.87 | 0.0022 | 0.037% | 55 | — |
| Example 4 | 2.84 | 0.0023 | 0.042% | 68 | — |
| Example 5 | 2.84 | 0.0026 | 0.040% | 59 | — |
| Example 6 | 2.79 | 0.0025 | 0.07% | 76 | — |
| Example 7 | 3.21 | 0.0026 | 0.048% | 13 | — |
| Example 8 | 3.23 | 0.0021 | 0.035% | 12 | — |
| Example 9 | 3.29 | 0.0019 | 0.041% | 14 | — |
| Example 10 | 3.18 | 0.0021 | 0.046% | 12 | — |
| Example 11 | 3.2 | 0.0015 | 0.051% | 10 | — |
| Example 12 | — | — | — | — | 1.5 |
| Comparative Example 1 | 2.76 | 0.01 | 0.2% | 72 | — |
| Comparative Example 2 | 2.78 | 0.006 | 0.25% | 63 | — |
| Comparative Example 3 | 2.87 | 0.0025 | 0.32% | 62 | — |
| Comparative Example 4 | 2.81 | 0.008 | 0.21% | 68 | — |
| Comparative Example 5 | 3.12 | 0.0084 | 0.26% | 15 | — |
| Comparative Example 6 | 3.15 | 0.0051 | 0.22% | 16 | — |
| Comparative Example 7 | 3.22 | 0.0021 | 0.45% | 13 | — |

Referring to Table 1, all the cured siloxane or the glass fabric reinforced plastics according to Examples 1 to 11 have dielectric constant of 3.3 or less and dielectric loss of 0.005 or less at 10 GHz, thereby having excellent low dielectric characteristics.

Referring to Table 1, since all the glass fabric reinforced plastics according to Examples 7 to 11 have lower dielectric loss than the cured siloxane according to Examples 1 to 6 at 10 GHz, and additional dielectric loss reduction effects are derived when preparing fabric reinforced plastic films or sheets by including a glass cloth in the cured siloxane.

Referring to Table 1, the cured siloxane or the glass fabric reinforced plastics according to Examples 1 to 11 have excellent hygroscopic resistance because all films have hygroscopicity of 0.1% or less.

Referring to Table 1, the thermal expansion coefficients of the cured siloxane according to Examples 1 to 6 are all 50 ppm/° C. or higher, but the thermal expansion coefficients of the glass fabric reinforced plastics according to Examples 7 to 11 are 15 ppm/° C. or less. Accordingly, when preparing glass fabric reinforced plastic films or sheets by including a glass cloth in the cured siloxane, characteristics are derived, which are very suitable for application to printed circuit boards for high-frequency communication electronic devices in terms of thermal processing.

Referring to Table 1, since the copper foil peel strength of the copper clad laminate according to Example 12 is 1.5 N/mm to have excellent adherence, such copper clad laminate is very suitable for printed circuit boards for high-frequency communication electronic devices.

On the other hand, referring to Table 1, all the cured siloxane or the glass fabric reinforced plastic film according to Comparative Examples 1 to 6 have dielectric loss of 0.005 or more at 10 GHz, which is not suitable to be applied to printed circuit boards for high-frequency communication electronic devices.

In addition, referring to Table 1, the cured siloxane or the glass fabric reinforced plastic films according to Comparative Examples 3 and 7 has hygroscopicity of 0.1% or more, which is not suitable to be applied to printed circuit boards for high-frequency communication electronic devices.

Although preferred Examples of the present invention have been described in detail above, the scope of the present invention is not limited thereto, and various modifications and improvements by a person of an ordinary skill in the art using the basic concept of the present invention as defined in the following claim ranges also fall within the scope of the present invention.

What is claimed is:

1. A siloxane resin composition, comprising
first organic alkoxy silane having a silicon-based structure represented by the following Chemical Formula 1, $$R^1_a R^2_b Si(OR^3)_2 \qquad \text{[Chemical Formula 1]}$$

wherein, in the above Chemical Formula 1,
$R^1$ comprises a linear or branched $C_{2-20}$ alkenyl group,
$R^2$ comprises H, a linear or branched $C_{1-20}$ alkyl group, a $C_{6-20}$ aryl group, or a $C_{2-20}$ alkenyl group,
$R^3$ comprises a linear or branched $C_{1-7}$ alkyl group, and
$1 \le a \le 2$, $0 \le b \le 1$, and $a+b=2$,
second organic alkoxy silane having a silicon-based symmetric structure represented by the following Chemical Formula 2, $$R^4_2 Si(OR^5)_2 \qquad \text{[Chemical Formula 2]}$$

wherein, in the above Chemical Formula 2,
$R^4$ comprises a $C_{6-20}$ aryl group, and
$R^5$ comprises a linear or branched $C_{1-7}$ alkyl group,
a siloxane resin prepared with the first organic alkoxy silane and the second organic alkoxy silane represented by the following Chemical Formula 3, $$(R^1_a R^2_b SiO)_x (R^4_2 SiO)_y \qquad \text{[Chemical Formula 3]}$$

wherein, in the above Chemical Formula 3,
$1 \le x$, $1 \le y$, and $x \le y$, and
a radical polymerization initiator.

2. The siloxane resin composition of claim 1, wherein:
the first organic alkoxy silane comprises one or more of vinylmethyldimethoxysilane, vinylmethyldiethoxysilane, vinylphenyldimethoxysilane, vinylphenyldiethoxysilane, divinyldimethoxysilane, divinyldiethoxysilane, allyldimethoxysilane, allylmethyldimethoxysilane, allylmethyldiethoxysilane, or dimethoxymethyl (4-vinylphenyl)silane.

3. The siloxane resin composition of claim 1, wherein:
the second organic alkoxy silane comprises one or more of diphenyldimethoxysilane, diphenyldiethoxysilane, bis(4-methylphenyl)dimethoxysilane, bis(4-methylphenyl)diethoxysilane, bis(o-tolyl)dimethoxysilane, bis(o-tolyl)diethoxysilane, bis(m-tolyl)diethoxysilane, bis(m-tolyl)dimethoxysilane di(naphthalen-1-yl)dimethoxysilane, or di(naphthalen-1-yl)diethoxysilane.

4. The siloxane resin composition of claim 1, further comprising:
third organic alkoxy silane having a silicon-based symmetric structure represented by the following Chemical Formula 4, $$R^6_2 Si(OR^7)_2 \qquad \text{[Chemical Formula 4]}$$

wherein, in the above Chemical Formula 4,
$R^6$ comprises a linear, branched, or cyclic $C_{1-20}$ alkyl group, and
$R^7$ comprises a linear or branched $C_{1-7}$ alkyl group, and a siloxane resin prepared with the first organic alkoxy silane, the second organic alkoxy silane, and the third organic alkoxy silane represented by the following Chemical Formula 5,

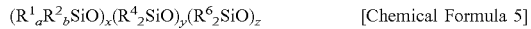  [Chemical Formula 5]

wherein, in the above Chemical Formula 5, $1 \leq x$, $1 \leq y$, $1 \leq z$, and $x \leq y+z$.

5. The siloxane resin composition of claim 4, wherein:
the third organic alkoxy silane comprises one or more of dimethyldimethoxysilane, dimethyldiethoxysilane, diisobutyldimethoxysilane, diisobutyldiethoxysilane, diisopropyldimethoxysilane, diisopropyldiethoxysilane, di-n-butyldimethoxysilane di-n-butyldiethoxysilane, di-n-propyldimethoxysilane, di-n-propyldiethoxysilane, dicyclopentyldimethoxysilane, or dicyclopentyldiethoxysilane.

6. The siloxane resin composition of claim 4, wherein:
the sum of the molar content of the second organic alkoxy silane and the molar content of the third organic alkoxy silane is greater than the molar content of the first organic alkoxy silane, and the molar content of the second organic alkoxy silane is greater than the molar content of the third organic alkoxy silane.

7. The siloxane resin composition of claim 1, further comprising:
a cross-linking agent.

8. The siloxane resin composition of claim 7, wherein:
the cross-linking agent comprises at least one selected from the group consisting of vinyltetramethyldisiloxane, vinylpentamethyldisiloxane, 1,3-divinyl-1,3-diphenyl-1,3-dimethyldisiloxane, 1,3-divinyltetraphenyldisiloxane, 1,1,3,3-tetravinyldimethyldisiloxane, 1,3-divinyltetraethoxydisiloxane, 1,3-divinyltetrakis(trimethylsiloxy)disiloxane 1,3-divinyltetramethyldisiloxane, 1,3-diphenyltetrakis(dimethylsiloxy)disiloxane, hexamethyldisiloxane 1,5-divinyl-3,3-diphenyl-1,1,5,5-tetramethyltrisiloxane, 1,5-divinyl-3-phenylpentamethyltrisiloxane, 1,3,5-trivinyl-1,1,3,5,5-pentamethyltrisiloxane 2,4,6-trivinyl-2,4,6-trimethylcyclotrisiloxane, 2,4,6,8-tetravinyl-2,4,6,8-tetramethylcyclotetrasiloxane, octavinyl-T8-silsesquioxane, phenyltris(trimethylsiloxy)silane, phenyltris(dimethylsiloxy)silane, tris(trimethylsiloxy)silane, tris(vinyldimethylsiloxy)methylsilane, tris(vinyldimethylsiloxy)phenylsilane, tris(dimethylsiloxy)silane, divinylbenzene, p-divinylbenzene, vinyldimethylsilane, vinyltrimethylsilane, vinyltriethylsilane, vinyltriphenylsilane, vinyl-t-butyldimethylsilane, vinyl-di-n-octylmethylsilane, vinylphenylmethylsilane, vinylphenyldimethylsilane, divinyldimethylsilane, trivinylsilane, trivinylmethylsilane, tetravinylsilane, vinyldimethylmethoxysilane, vinylphenylmethylmethoxysilane, vinyldimethylethoxysilane, vinyldiphenylethoxysilane, vinylmethyldimethoxysilane, vinylmethyldiethoxysilane, vinylphenyldiethoxysilane, vinyltrimethoxysilane, vinyltriethoxysilane, vinyl triisopropoxysilane, vinyl-tri-t-butoxysilane, vinyltriisoprophenoxysilane, vinyltriphenoxysilane, vinyltris(2-methoxyethoxy)silane, vinyltris(methoxypropoxy)silane, trivinylmethoxysilane, trivinylethoxysilane, vinylmethylbis(trimethylsiloxy)silane, vinyltris(dimethylsiloxy)silane, vinyltris(trimethylsiloxy)silane, tetrakis(vinyldimethylsiloxy) silane, vinylmethyldiacetoxysilane, vinyltriacetoxysilane, 2-prophenyltrimethylsilane, (1-methoxyvinyl)trimethylsilane, 1,2-divinyltetramethyldisilane, 1,4-divinyltetramethyldisilylethane, 1,4-bis(vinyldimethylsilyl)benzene, 1-allyl-1,1,3,3-tetramethyldisiloxane, 1,3-diallyltetramethyldisiloxane and 1,3-diallyltetrakis(trimethylsiloxy)disiloxane, allyldimethylsilane, allyltrimethylsilane, allyltriisopropylsilane, allyltriphenylsilane, diallyldimethylsilane, diallyldiphenylsilane, triallylmethylsilane, tetraallylsilane, allyldimethoxysilane, allyltrimethoxysilane, allyltriethoxysilane, allyltriphenoxysilane, allyltris(trimethylsiloxy)silane, 2,4,6,8-tetramethylcyclotetrasiloxane, octamethyl-T8-silsesquioxane, 1,1-bis(trimethylsilylmethyl)ethylene, 1,1-bis(trimethoxysilylmethyl)ethylene, methallyltrimethylsilane, diethoxymethylsilane, dimethoxymethylsilane, n-octadecylmethyldiethoxysilane, n-octadecyldimethylethoxysilane, n-octadecyldimethylmethoxysilane, n-octadecylmethyldimethoxysilane, n-octadecyldimethylsilane, n-octylmethyldiethoxysilane, n-octylmethyldimethoxysilane, n-octyldimethylmethoxysilane, n-octyldimethylethoxysilane, isobutylmethyldimethoxysilane, bis(trimethylsiloxy)methylmethoxysilane, tris(trimethylsilyl)silane, 1,2-diethoxytetramethyldisilane, phenyldimethylethoxysilane, n-propylmethyldimethoxysilane, n-propyldimethylmethoxysilane, methyltriethoxysilane, methyltrimethoxysilane, dimethyldimethoxysilane, dimethyldiethoxysilane, phenylmethyldimethoxysilane, phenylmethyldiethoxysilane, phenylethynetrimethylsilane, diphenylmethylethoxysilane, diphenylmethylmethoxysilane, diphenylmethylsilane, phenyldimethylsilane, 1,3-dimethyltetramethoxydisiloxane, tetrakis(dimethylsiloxy)silane, methyltris(methoxyethoxy)silane, ethyldimethylsilane, dimethylethoxysilane, tris(trimethylsiloxy)silane, tert-butyldimethylsilane, di-tert-butylmethylsilane, 1,1,2,2-tetramethyldisilane, 1,1,3,3,5,5-hexamethyltrisiloxane, 1,5-diethoxyhexamethyltrisiloxane, phenyltrimethylsilane, 1,4-bis(4-vinylphenoxy) butane, di-4-vinylbenzyl ether, divinyldiphenyl, divinylnaphthalene, 1-heptene, 1-octene, 1,4-pentadiene, 1,5-hexadiene, 1,6-heptadiene, 1,7-octadiene, 1,9-decadiene, and combinations thereof.

9. The siloxane resin composition of claim 1, wherein:
the radical polymerization initiator comprises a peroxide radical polymerization initiator.

10. The siloxane resin composition of claim 9, wherein:
the peroxide radical polymerization initiator comprises at least one selected from the group consisting of 2,3-dimethyl-2,3-diphenylbutane, tert-butyl-hydroperoxide, tert-amylhydroperoxide, cumylhydroperoxide, 1,1,3,3-tetramethylbutylhydroperoxide, isopropylcumylhydroperoxide, isopropylbenzene hydroperoxide, 2,5-dimethyl-2,5-di(tert-butylperoxy) hexyne-3,3,6,9-triethyl-3,6,9-trimethyl-1,4,7-triperoxonane, di(tert-butyl)-peroxide, 2,5-dimethyl-2,5-di(tert-butylperoxy) hexane, di(tert-butylperoxy-isopropyl)benzene, tert-butylcumylperoxide, di-(tert-amyl)-peroxide, dicumylperoxide, butyl4,4-di(tert-butylperoxy) valerate, tert-butylperoxybenzoate, 2,2-di(tert-butylperoxy) butane, tert-amylperoxy-benzoate, tert-butylperoxy-acetate, tert-butylperoxy-(2-ethylhexyl) carbonate, tert-butylperoxy isopropyl carbonate, tert-butylperoxy-3,5,5-trimethyl-hexanoate, 1,1-di(tert-butylperoxy)cyclohexane, tert-amylperoxyacetate, tert-amylperoxy-(2-ethylhexyl) carbonate, 1,1-di(tert-butylperoxy)-3,5,5-trimethylcyclohexane, 1,1-di(tert-amylpooxy)cyclohexane, tert-butyl-monoperoxymalate, 1,1'-azodi(hexahydrobenzonitrile), tertbutylperoxy-isobutyrate, tert-butyl peroxydiethylacetate, tert-butylperoxy-2-ethylhexanoate, benzoyl peroxide, tert-amylperoxy-2-ethylhexanoate, di(3-methylbenzoyl) peroxide, 1,1,3,3-tetramethylbutyl peroxy-2-ethylhexanoate, ammonium peroxodisulfate, 2,5-dimethyl-2,5-di(2-ethylhexanoylperoxy) hexane, 2,2'-azodi(2-methylbutyronitrile), 2,2'-azodi (isobutyronitrile), didecanoylperoxide, dilauroylperoxide, di(3,5,5-trimethylhexanoyl) peroxide, tert-amylperoxypivalrate, tert-butylperoxyneoheptanoate, 1,1,3,3-tetramethylbutyl peroxypivalate, tert-butylperoxypivalate, dicetylperoxydicarbonate, dimyristyl peroxydicarbonate, di(2-ethylhexyl)peroxydicarbonate, di(4-tert-butylcyclohexyl)peroxycarbonate, diisopropylperoxydicarbonate, tert-butylperoxyneodecanoate, di-sec-butylperoxydicarbonate, tert-amylperoxyneodecanoate, cumyl peroxyneoheptanoate, di(3-methoxybutyl)peroxydicarbonate, 1,1,3,3-tetramethylbutyl peroxyneodecanoate, cumylperoxyneodecanoate, diisobutyrylperoxide, and combinations thereof.

11. The siloxane resin composition of claim 1, wherein:
a cured material of the siloxane resin composition has dielectric constant of 3.3 or less at a frequency of 10 GHz and dielectric loss of 0.005 or less at a frequency of 10 GHz.

12. The siloxane resin composition of claim 1, wherein:
a cured material of the siloxane resin composition has hygroscopicity of 0.1% or less as measured based on ASTM D570 standard.

13. A siloxane resin manufacturing method, comprising:
preparing a mixture by mixing first organic alkoxy silane having a silicon-based asymmetric structure, second organic alkoxy silane having a silicon-based symmetric structure, third organic alkoxy silane having a silicon-based symmetric structure, and an acid or base catalyst;
carrying out a condensation reaction at 40° C. to 300° C. by agitating the mixture;
removing the acid or base catalyst; and
adding a peroxide radical polymerization initiator.

14. The siloxane resin manufacturing method of claim 13, wherein:
the acid catalyst comprises one or more of hydrochloric acid, sulfuric acid, nitric acid, formic acid, acetic acid, toluenesulfonic acid, acetic acid, butyric acid, palmitic acid, oxalic acid, or tartaric acid.

15. The siloxane resin manufacturing method of claim 13, wherein:
the base catalyst comprises one or more of an alkali metal compound, an alkaline-earth metal compound, a quaternary ammonium compound, ammonia, or an amine compound.

16. The siloxane resin manufacturing method of claim 13, wherein:
the removing of the base catalyst comprises adding an organic solvent to dissolve siloxane and then separating the organic solvent, in which a siloxane resin is dissolved, from the base catalyst by a solvent extraction method.

17. A sheet, comprising a cured material for the siloxane resin composition according to claim 1.

* * * * *